(12) United States Patent
Roh et al.

(10) Patent No.: US 6,430,946 B2
(45) Date of Patent: Aug. 13, 2002

(54) STRUCTURE FOR MOUNTING MONITOR ON REFRIGERATOR

(75) Inventors: Young Hoon Roh, Seoul; Kwang Choon Kim; Jin Cheol Cho, both of Kyonggi-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/750,713

(22) Filed: Jan. 2, 2001

(30) Foreign Application Priority Data

Mar. 30, 2000 (KR) .......................................... 2000-16564

(51) Int. Cl.⁷ ............................................... F25D 19/00
(52) U.S. Cl. .......................................... 62/125; 62/298
(58) Field of Search ........................... 62/125, 126, 127, 62/129, 130, 298, 299, 440, 448

(56) References Cited

U.S. PATENT DOCUMENTS 4,802,060 A * 1/1989 Immel ...................... 62/298 X
4,821,530 A * 4/1989 Ledbetter .................. 62/440 X
5,921,095 A * 7/1999 Lee et al. .................. 62/127 X

FOREIGN PATENT DOCUMENTS

JP         2-259383      * 10/1990 .................. 62/298

* cited by examiner

Primary Examiner—Harry B. Tanner
(74) Attorney, Agent, or Firm—Birch, Stewart, Kolasch & Birch, LLP

(57) ABSTRACT

Structure for mounting a monitor on a refrigerator including the monitor mounted on a front face of the refrigerator for presenting a picture, and a controlling part mounted on a top of the refrigerator for providing a picture signal to the monitor for presenting a state of the refrigerator and internet information, wherein cables connecting the displaying part and the driving circuit are resistant to noise, thereby permitting no trespass into a food space at all and an easy mounting on the door.

5 Claims, 3 Drawing Sheets

STRUCTURE FOR MOUNTING MONITOR ON REFRIGERATOR

BACKGROUND OF THE INVENTION

1. Field of the Invention

The present invention relates to a refrigerator, and more particularly, to a structure for mounting a computer and a monitor, an output device thereof, on a refrigerator.

2. Background of the Related Art

As well known, as an appliance for fresh storage of food and cooking materials by producing cooled air therein, the refrigerator is developed to have a variety of functions for satisfying demands of the consumers, recently. Particularly, it is recent trend that home appliances are required to present information on states of the home appliances themselves, or a variety of information provided from the internet, to users, keeping pace with popularization of the internet. Other than the above information presentation, the home appliances are required to present information to the users required for controlling operation and the like of the home appliances from outside of the house. Accordingly, to meet such requirements, there are the home appliances, particularly the refrigerators, each having a computer with the foregoing functions provided thereto, developed recently. The refrigerator having the computer can present not only information on a state of the refrigerator itself, but also cooking information from the internet and a data base, and even information on data of cooking material stored in the refrigerator. FIG. 1 schematically illustrates a related art refrigerator having a computer with the above functions, provided with a control part 4 in a rear wall of the a cabinet 11 of the refrigerator 1, inclusive of a controller(hereafter called as "information processor") acting as a computer body and an operation controller for controlling operation of the refrigerator, and a monitor 2 having a camera 3 at a central portion of a door 12 in a front portion of the refrigerator, for receiving a picture signal from the control part 4 and presenting desired information to the user. As the monitor 2, a thin LCD(Liquid Crystal Display) is the most suitable, considering a thickness of the door 12, rather than other displays, such as Braun tube. However, the related art refrigerator having the computer mounted thereon has the following problems.

First, a driving circuit 22 with a thickness fitted to a rear surface of the LCD 21 mounted in the door 12 can not but trespass into a food space on an inner side of the door 12 to some extent, which results in a smaller the food and poor appearance.

Second, cables(not shown) for connecting the LCD 21 to the information processor in the control part 4 for reception of the picture signal are complicate as the cables are required to run from back to front of the refrigerator.

SUMMARY OF THE INVENTION

Accordingly, the present invention is directed to a structure for mounting a monitor on a refrigerator that substantially obviates one or more of the problems due to limitations and disadvantages of the related art.

An object of the present invention is to provide a structure for mounting a monitor on a refrigerator, which permits no trespass into a food space at all and an easy mounting on the door.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the structure for mounting a monitor on a refrigerator including the monitor mounted on a front face of the refrigerator for presenting a picture, and a controlling part mounted on a top of the refrigerator for providing a picture signal to the monitor for presenting a state of the refrigerator and internet information, wherein cables connecting the displaying part and the driving circuit are resistant to noise.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2:
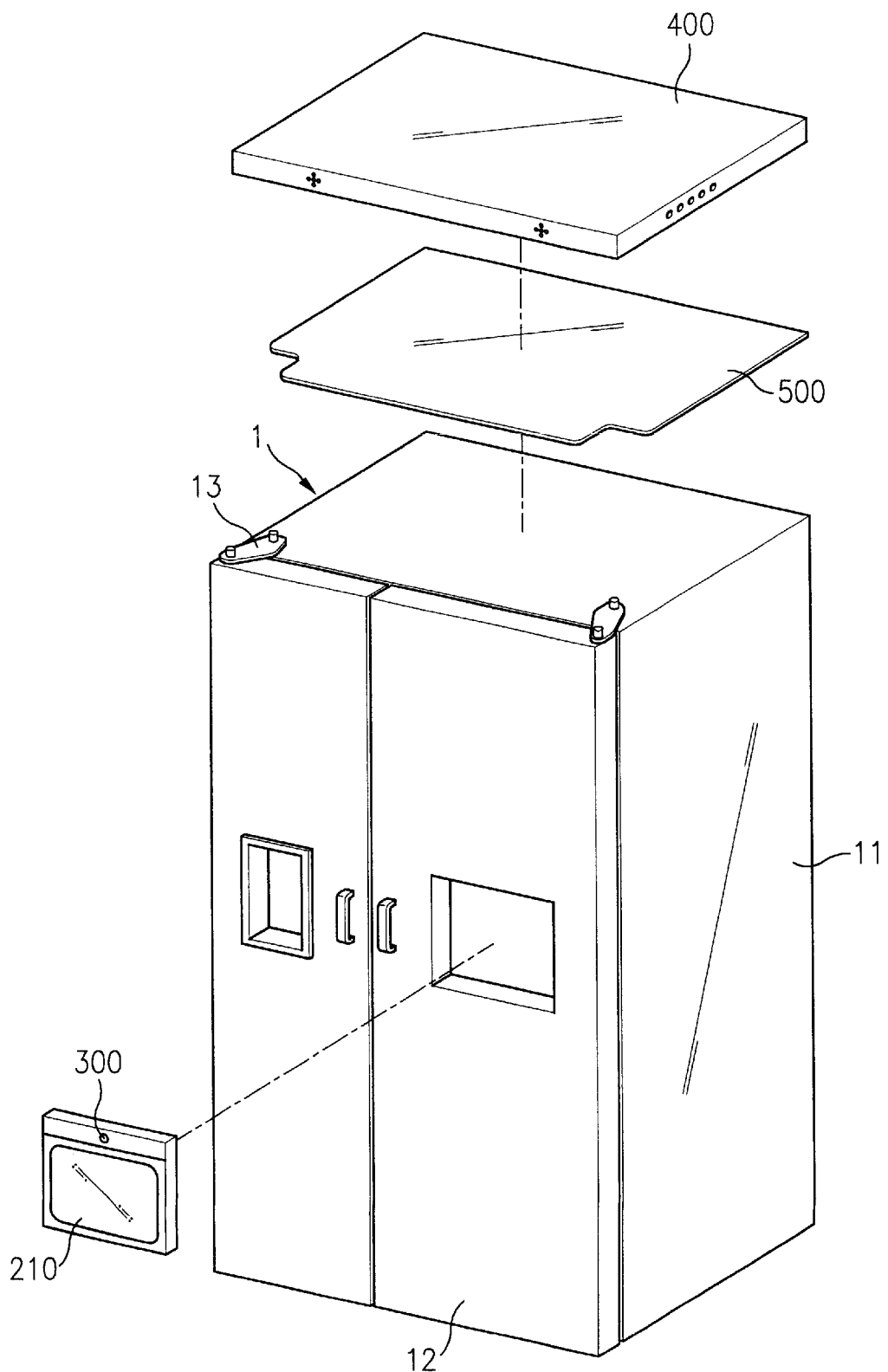
FIG. 2 schematically illustrates a disassembled view of a computer mounting type refrigerator with a monitor mounted thereto in accordance with a preferred embodiment of the present invention; and, FIG. 3 illustrates a system of a control part in the refrigerator.

Reference will now be made in detail to the preferred embodiments of the present invention, examples of which are illustrated in the accompanying drawings. FIG. 2 schematically illustrates a disassembled view of a computer mounting type refrigerator with a monitor mounted thereto in accordance with a preferred embodiment of the present invention.

Figure 1:
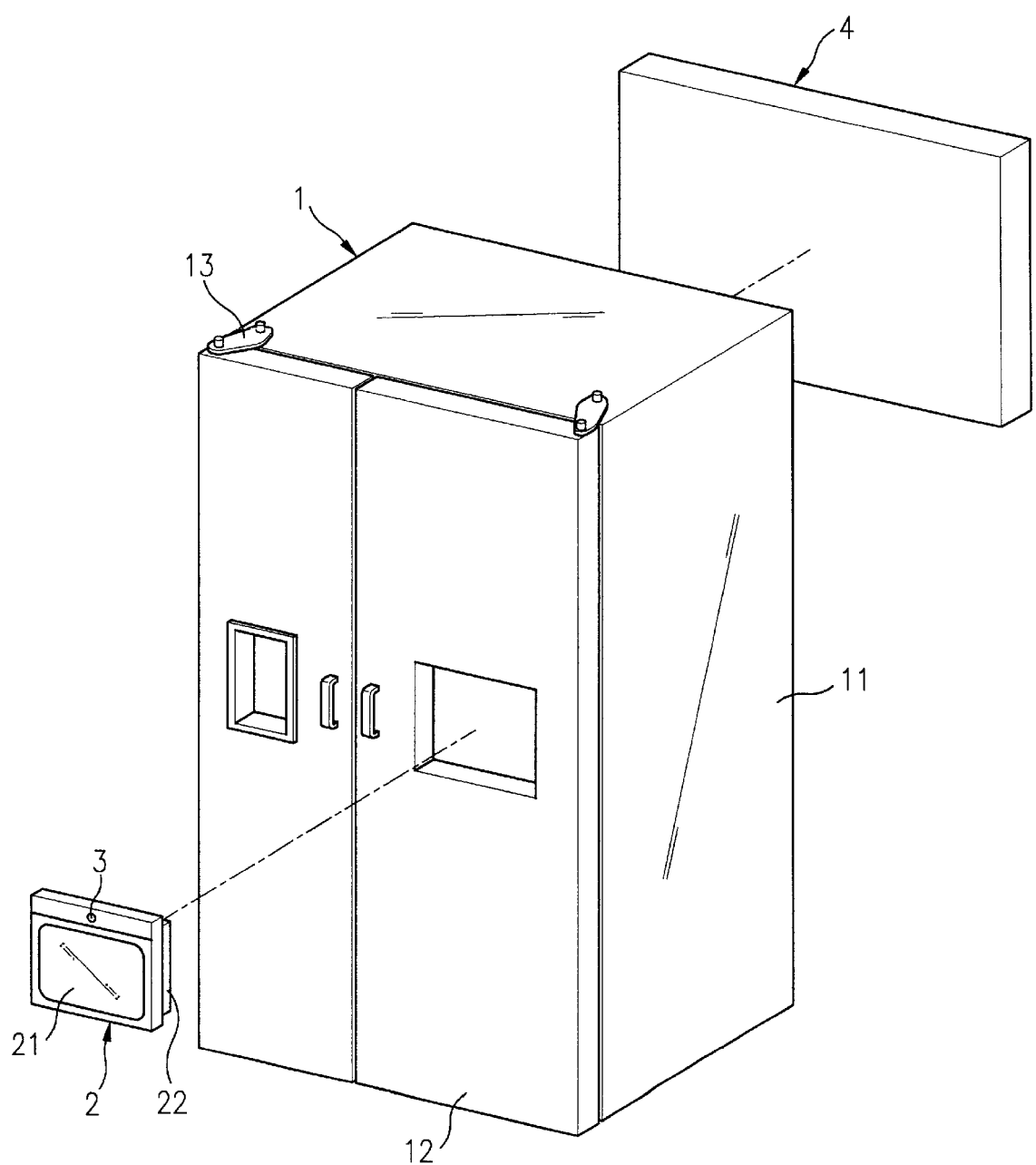
FIG. 1 schematically illustrates a disassembled view of a related art computer mounting type refrigerator with a monitor mounted thereto.

Referring to FIG. 2, there is a monitor, for example, a displaying part 210 of an LCD, having a camera 300 at a central portion in a refrigerator door 12, and a controlling part 400 on a top of a refrigerator cabinet 11. And, there is steel plate 500 of a thickness, preferably approx. 1 mm thick, under the controlling part 400, i.e., between the top of the cabinet 11 and a bottom of the controlling part 400, for preventing damage to an outer skin of the cabinet 11 of thin plate if various controllers in the controlling part is fitted to the top of the cabinet 11 directly, or for firm fitting of the various controllers. In the refrigerator of the present invention, it is preferable that the monitor mounted to the refrigerator has the displaying part 210 for presenting a picture and the driving circuit(see FIG. 1) for providing the picture signal to the displaying part 210 separated from each other. In this instance, as described, the displaying part 210 is mounted in the door 12, the driving circuit in the controlling part 400, and the displaying part 210 and the driving part are connected with cable which is resistant to noise. Though different types of display may be used as the monitor, an LCD is preferable, and, the LCD with a touch panel is the most preferably, which is operable by touching on a screen thereof directly, without using a keypad or the like.

Figure 3:
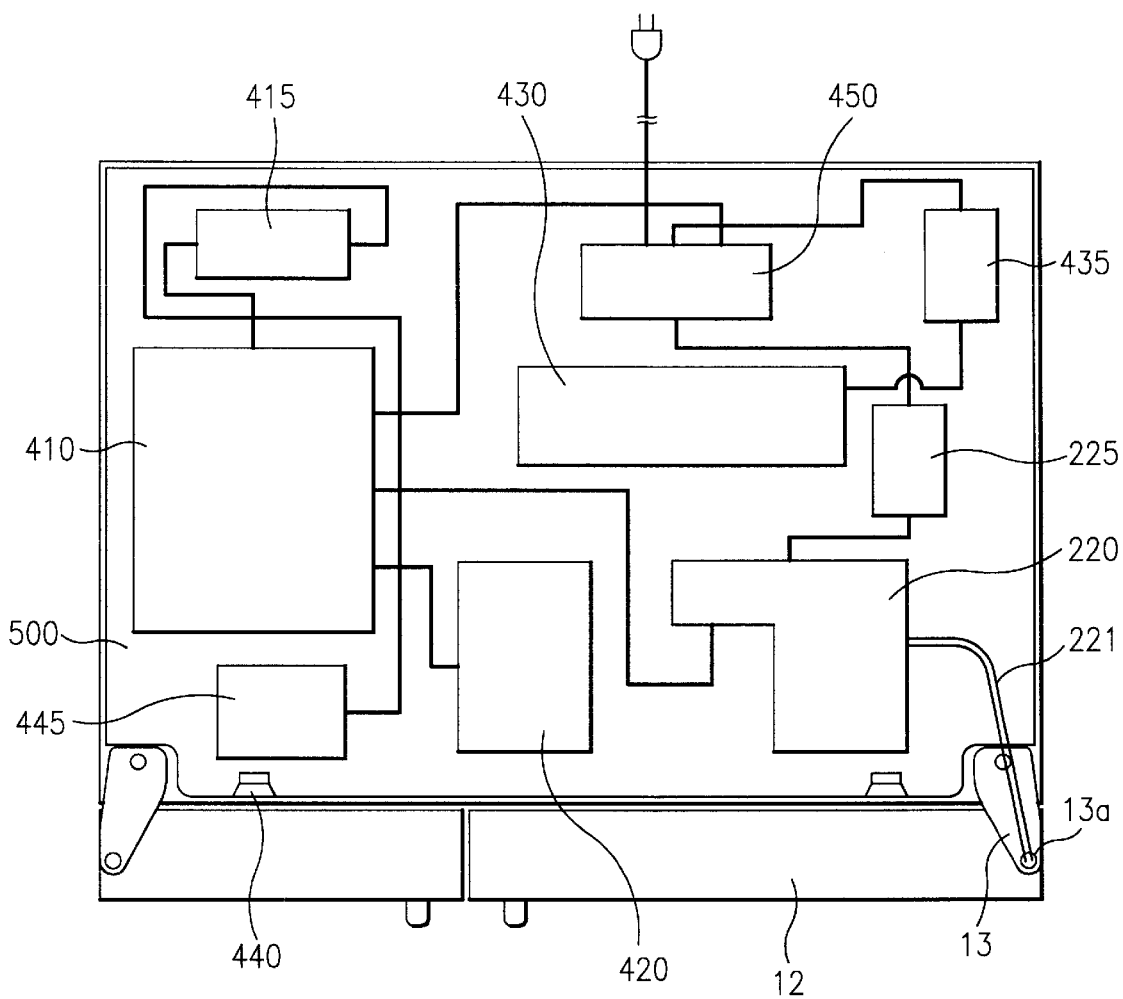

In the meantime, referring to FIG. 3, the controlling part 400 includes an information processor 410 for serving as a computer, a driving circuit 220 connected to the information processor 410 for transmitting a signal receiving from the information processor to the displaying part 210(see FIG. 2) as a picture signal, a modem 420 connected to the information process 410 for making a distant communication, and a TV tuner 415. The controlling part 400 may includes an operation controller 430 for controlling operation of the refrigerator, such as operation of a refrigerating cycle of the refrigerator. And, there are a speaker 440 and an amplifier PCB 445 in front of the controlling part 400, and a power source 450 in rear of the controlling part 400 for supplying power to the above controlling devices. The cables for transmitting the picture signal from the driving circuit 220 to the displaying part 210(see FIG. 2) are very thin lines 221 of LVDS (Low-Voltage Differential Signaling) or TMDS (Transition Minimized Differential Signaling), which are resistant to noise, lead to the displaying part 210 in the door 12 through a hole 13a in the hinge bracket 13. As the cables 221, connecting the displaying part 210 of the monitor and the driving circuit 220, are lead through the hinge bracket 13 in the door 12, the cables affect no opening/closing of the door, while permitting mounting of the displaying part 210 and the driving circuit 220, separately. Therefore, when the information processor 410 in the controlling part 400 processes data on a state of the refrigerator and data received through the internet, and the like, and transmits to the driving circuit part 220 as a picture signal, the driving circuit 220 processes the picture signal as a picture signal suitable for displaying and transmits to the displaying part 210 through the cables, and the displaying part 210 presents the picture signal to the user as a picture.

As has been explained, the structure for mounting a monitor on a refrigerator of the present invention has the following advantages.

The mounting of various controllers on top of the refrigerator for presenting various picture signals to the monitor and controlling operation of the refrigerator permits an easy utilization of a space of the refrigerator itself.

The mounting of only the displaying part in the door separate from the driving part permits the displaying part mounted in the door without trespassing the food space, at all.

It will be apparent to those skilled in the art that various modifications and variations can be made in the structure for mounting a monitor on a refrigerator of the present invention without departing from the spirit or scope of the invention. Thus, it is intended that the present invention cover the modifications and variations of this invention provided they come within the scope of the appended claims and their equivalents.

What is claimed is:

1. A structure for mounting a monitor on a refrigerator comprising:

the monitor mounted on a front face of the refrigerator for displaying a picture;

a controller mounted on the top of the refrigerator for providing a picture signal to the monitor for displaying the status of the refrigerator and internet information; and wherein the monitor includes a display means for displaying a visible picture to a user and a driving circuit for transmitting a picture signal to the display means, wherein the display means is mounted on the front face of the refrigerator and the driving circuit is mounted in the controller on the top of the refrigerator separate from said display means, and said display means and the controller being electrically connected to each other.

2. A structure as claimed in claim 1, wherein the controller includes an operation controller for controlling operation of the refrigerator.

3. A structure as claimed in claim 2, further including a plate attached to the top of the refrigerator, and the controller being mounted on the plate.

4. A structure as claimed in claim 1, wherein cables electrically connecting the display means in the monitor and the driving circuit pass through a hinge bracket at a corner of an upper portion of the refrigerator.

5. A structure as claimed in claim 1, wherein the cables connecting the display means in the monitor and the driving circuit are LVDS or TMDS and resistant to noise.

* * * * *